F. KRAUSE.
CUTTING MACHINE.
APPLICATION FILED NOV. 29, 1916.
1,220,518.
Patented Mar. 27, 1917.
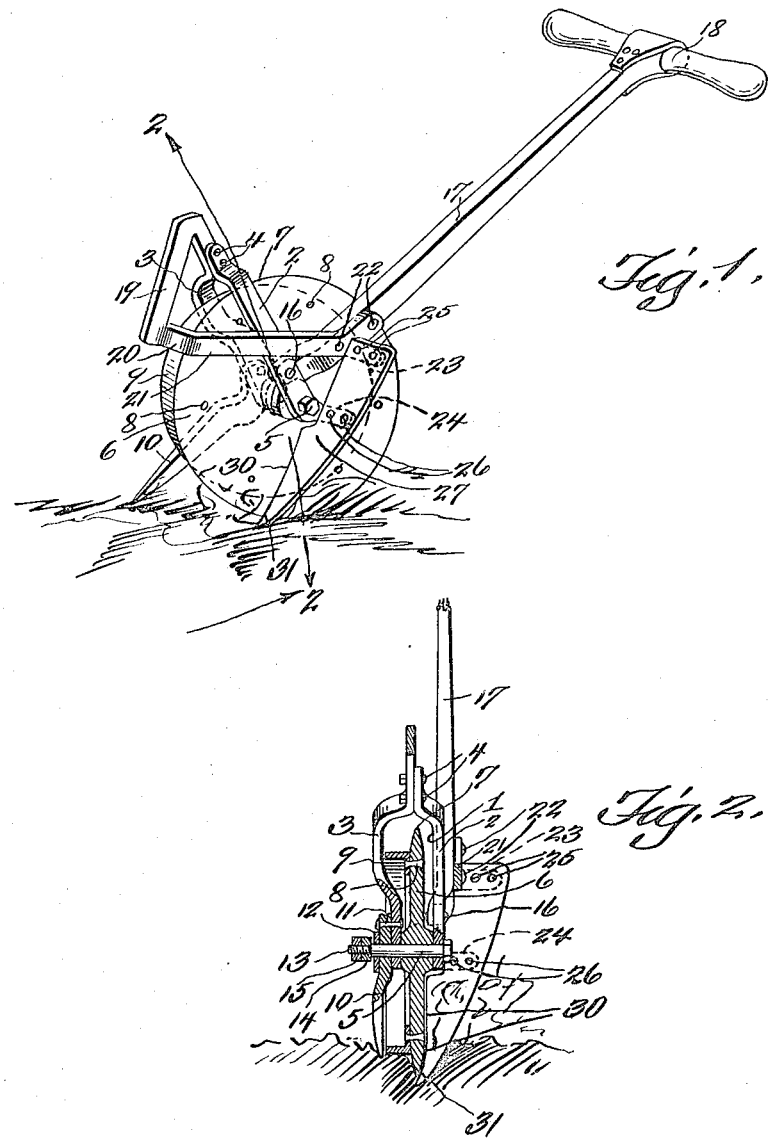
Witnesses
Inventor
Franz Krause,
By D. Swift & Co.
Attorneys

UNITED STATES PATENT OFFICE.

FRANZ KRAUSE, OF CONNELLSVILLE, PENNSYLVANIA.

CUTTING-MACHINE.

1,220,518.

Specification of Letters Patent.

Patented Mar. 27, 1917.

Application filed November 29, 1916. Serial No. 134,105.

*To all whom it may concern:*

Be it known that I, FRANZ KRAUSE, a citizen of the United States, residing at Connellsville, in the county of Fayette, State of Pennsylvania, have invented a new and useful Cutting-Machine; and I do hereby declare the following to be a full, clear, and exact description of the invention, such as will enable others skilled in the art to which it appertains to make and use the same.

This invention relates to a new and useful cutting machine, and an object of the invention is to provide a device of this kind especially adapted for cutting and trimming runners from strawberry plants and the like.

Another object of the invention is to provide a device of this kind having novel and efficient features of construction.

One of the features of construction is to provide a cutting disk mounted in bearings on an arched strap, and provided with a laterally extending annular flange to prevent the disk from sinking and cutting too deep into the soil, to cut the runners adjacent their roots.

A further object of the invention is to provide a member on one side of the cutting disk to push back the leaves of the strawberry plants to keep them from being cut off.

A further object of the invention is the provision of a knife having an inclined cutting edge which is disposed adjacent to one face of the disk, so as to coöperate with said disk, whereby the runners of the strawberry bushes or plants can be sheared off adjacent the edge of the disk. It is to be noted that the extreme lower portion of the cutting edge of the knife is bent toward the cutting edge of the disk, so that by virtue of the soil pushing upon the knife at its lower portion, the lower extremity of the cutting edge is held against the disk, and by reason of the fact that the runners of the strawberry plants lie flat on the ground, the runners are sheared by the knife coöperating with the disk. The weeds and the brush are kept out of the way by the member on the opposite side of the disk.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in perspective of the improved cutting machine constructed in accordance with the invention.

Fig. 2 is substantially a vertical sectional view on line 2—2 of Fig. 1.

Referring more especially to the drawings, 1 designates a substantially U-shaped frame consisting of the two sections or strips 2 and 3, which are secured together by means of the bolts 4. Mounted in the lower ends of the sections 2 and 3 is a shaft or bolt 5, on which is journaled a disk 6, the edge 7 of which enters the soil. Secured to the disk on one face thereof, by means of the rivets or the like 8, is a circular ring 9, angular in cross section, thereby providing a flange, which will prevent the disk from sinking or entering the soil too deep. This flange is of a diameter less than the disk, in order to attain the aforesaid result. The shaft or bolt also extends through the upper part of the member 10, the upper extremity of which is also secured to one side of the U-shaped frame, by means of the rivet 11. This member 10 is designed for the purpose of pushing back the leaves, so as to keep them from being cut off. A washer 12 is mounted upon the shaft or bolt, on the threaded reduced extremity 13 of which a nut 14 is threaded, there being a lock nut 15, to lock the nut 14, thereby holding the bolt or shaft from axial displacement. Secured by a suitable rivet or the like 16 to the strip or piece 2 of the U-shaped frame, is the lower end of the shank 17 of the handle 18 of the machine. The strip or piece 3 of the U-shaped frame extends upwardly beyond where it is secured at 4 to the strip or piece 2, and merges into the downwardly extending part 19, which in turn merges into an offset angular portion 20 which terminates in a substantially horizontal part 21, the extremity of which is secured by suitable bolts 22 to the handle shank 17, thereby bracing the structure. However, the extremity of the substantially horizontal part 21, and the lower extremity of the strip or piece 2 of the frame, are provided with ears or lugs 23 and 24, to which by means of the rivets or the like 25 and 26, a knife blade 27 is secured. This knife is provided with an inner cutting edge 30, which conforms substantially to the contour of the disk in cross section. When pushing the cutter or machine forward adjacent a row of strawberry plants, the runners may be cut by shearing them off at the very lowest part of the edge of the disk, say for instance, substantially an eighth of an inch, more or less, upwardly from the point of the knife, owing to the knife or blade being bent slightly at the point portion, whereby the cutting edge may extend toward the disk, and by the soil pushing against the knife, the knife is held as extending toward the disk. In other words, the extremity of the knife extends slightly below the lower end of the disk and by reason of the fact that the runners lie substantially flat on the soil or ground and between the rows of plants, the knife catches the runner, so that its cutting edge substantially at 31, will shear the runner between the cutting edge and the lower edge of the disk. It is to be understood that the handle shank 17 may be dispensed with, so that the improved strawberry plant runner cutter may be attached to a suitable cultivator, not shown, by means of springs or the like, whereby the cutter may ride up over the rough soil between the rows of strawberry plants.

The invention having been set forth, what is claimed as new and useful is:—

1. In a runner cutting machine, the combination of a substantially U-shaped frame and a cutting disk journaled in bearings at the lower ends of said frame, of a handle attached to said frame, and a knife blade secured to one side of said frame and the handle, and having a pointed lower extremity extending toward and slightly beyond the lower edge of the disk and provided with an inner cutting edge presented toward the side of the disk, whereby the runner may be picked up and severed between said cutting edge and the lower edge of the disk.

2. In a runner cutting machine, the combination of a substantially U-shaped frame and a cutting disk journaled in bearings at the lower ends of said frame, of a handle attached to said frame, and a knife blade secured to one side of said frame and the handle, and having a pointed lower extremity extending toward the side of the disk, whereby the runner may be picked up and severed between said cutting edge and the lower edge of the disk, and a brace between the frame and the handle.

3. In a runner cutting machine, the combination of a substantially U-shaped frame and a cutting disk journaled in bearings at the lower ends of said frame, of a handle attached to said frame, and a knife blade secured to one side of said frame and the handle, and having a pointed lower extremity extending toward the side of the disk, whereby the runner may be picked up and severed between said cutting edge and the lower edge of the disk, and a brace between the frame and the handle, one face of the disk having an annular laterally extending flange of a diameter a trifle less than the diameter of the disk to prevent the disk from excessively entering into the soil.

In testimony whereof I have signed my name to this specification in the presence of two subscribing witnesses.

FRANZ KRAUSE.

Witnesses:
  ALEX ENOS,
  J. B. KURTZ

Copies of this patent may be obtained for five cents each, by addressing the "Commissioner of Patents, Washington, D. C."